Sept. 24, 1957 T. R. BETTENCOURT 2,807,683
FLUSH SWITCH AND CASING THEREFOR
Filed Oct. 7, 1954 2 Sheets-Sheet 1

Inventor
Theodore R. Bettencourt
by Wright, Brown, Quimby & May
Attys.

Sept. 24, 1957 T. R. BETTENCOURT 2,807,683
FLUSH SWITCH AND CASING THEREFOR
Filed Oct. 7, 1954 2 Sheets-Sheet 2

Inventor
Theodore R. Bettencourt
by Wright Brown Quinby & May
Attys.

United States Patent Office 2,807,683
Patented Sept. 24, 1957

2,807,683
FLUSH SWITCH AND CASING THEREFOR

Theodore R. Bettencourt, New Bedford, Mass., assignor to John I. Paulding, Inc., New Bedford, Mass., a corporation of Massachusetts Application October 7, 1954, Serial No. 460,890

11 Claims. (Cl. 200—67)

This invention relates to flush wall switches and has for one object to provide a switch which will be substantially silent in operation.

A further object is to provide a switch having relatively few and simple parts.

Still another object is to provide a switch casing or box adapted with slight changes to single or double pole and three or four-way switches, thus making possible simplification of dies for the molding operations required in the manufacture of such switches.

A further object is to so form the switch that when it is installed the contacts will be in the upper end of the switch box out of the way of foreign matter, such as dust, which will settle in the lower end of the box where it will not interfere with the switch operation.

Still another object is to provide a switch wherein the contact-making fingers are positioned for lateral motion in closing or opening the switch so that no special jig is necessary to hold the parts in position for assembly, since the pressure is sidewise and not up and out of the box. This also makes possible the use of flat blanks for terminal plates which are simple to make and assemble, and require little material.

Still another object is to so locate the toggle spring that when it is placed in the switch box it is held in position for the toggle lever to properly engage it.

A further object is to provide a construction wherein the switch is open in the single and double pole arrangement, should the toggle lever stop in mid-position.

For a complete understanding of this invention, reference may be had to the accompanying drawings in which Figure 1 is a face view of a double pole switch embodying the invention, the switch being "off."

Figures 16 to 19, inclusive, are diagrammatic views illustrating preferred practice in connecting: (1) a single pole switch; (2) a double pole switch; (3) two three-way switches, and (4) two three and one four-way switches.

Figure 1:
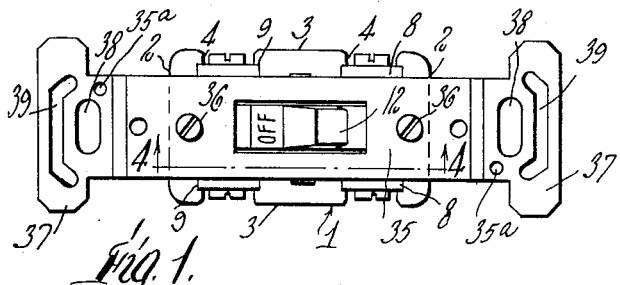
Figure 2:
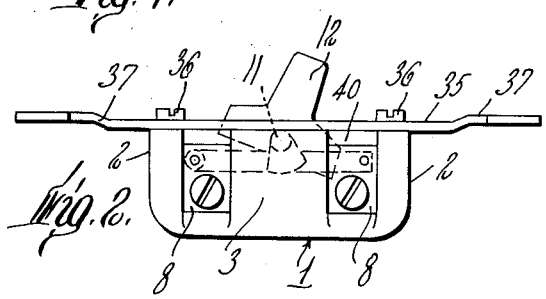
Figure 2 is a side elevation of the same.
Figure 3:
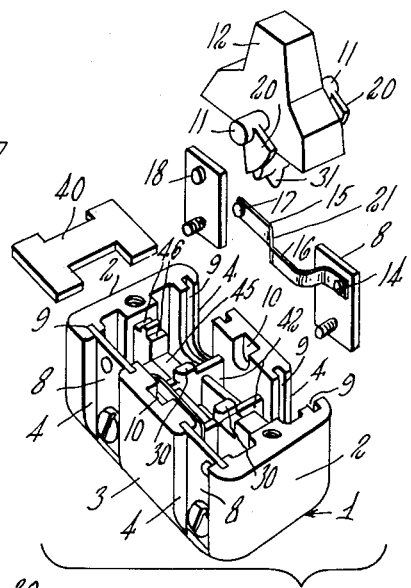
Figure 3 is an exploded perspective view of the same.
Figure 4:
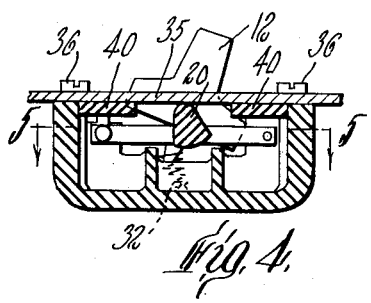
Figure 4 is a detail sectional view on line 4—4 of Figure 1.
Figure 5:
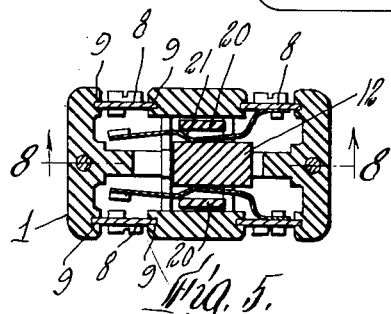
Figure 5 is a detail sectional view on line 5—5 of Figure 4.
Figure 6:
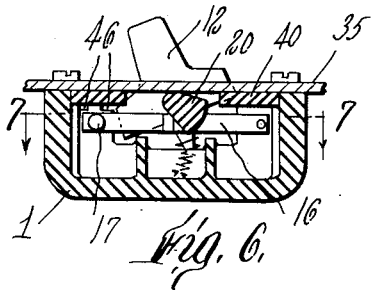
Figure 6 is a view similar to Figure 4, but showing the switch "on."
Figure 7:
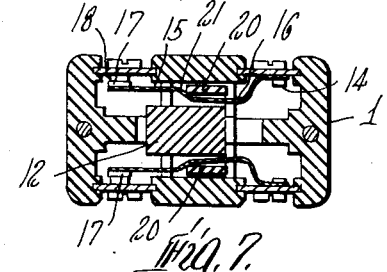
Figure 7 is a detail sectional view on line 7—7 of Figure 6.

Referring first more particularly to Figure 3, the switch comprises a box of insulating material having a base 1 from which arise end walls 2 and side walls 3. Adjacent to the end walls 2, each side wall is provided with a recess 4 in the form of a deep notch which may be occupied either by insulation, preferably integral with the box as shown at 7 in Figures 10 and 11, or by a conductive terminal plate 8. Where a terminal plate is employed, it may be arranged to fit within marginal grooves 9 in the edges of a recess 4 as shown in Figures 3, 5, and 7. These plates 8 are merely small flat sheet metal pieces and are arranged parallel to their carrying walls.

Adjacent to the centers, the side walls 3 are shown as provided with sockets 10 within which may be journaled trunnions 11 of a switch actuating lever 12. Where terminal plates 8 are employed in place of the insulating wall portion 7, such terminal plates are employed at least in both recesses on the same side of the box, and to one of these terminal plates there is secured as at 14 (see Figure 3), one end of a spring contact arm 15 having a centrally inwardly bowed portion 16. The other end of the arm 15 is provided with a contact member 17. These parts are so positioned that the terminal member 17 is normally in contact with a contact button 18 on the other terminal plate 8 on the same side of thte box, but the actuating lever 12 is provided with one or more cam elements 20 which in one angular position of the lever engage the outer face of the corresponding arm 15 on its sloping portion 21 and force the contact member 17 out of engagement with its button 18 of the terminal plate. In the other angular position of the lever 12 the cam elements 20 are out of engagement with the corresponding spring arm and allow contact to be made between the members 17 and 18. In the mid-position of the lever the contact between the spring arm and its button 18 is broken. As assembled in the wall the contact buttons are in the upper end of the switch out of the way of foreign material, such as dust, which may be in the box.

Figure 8:
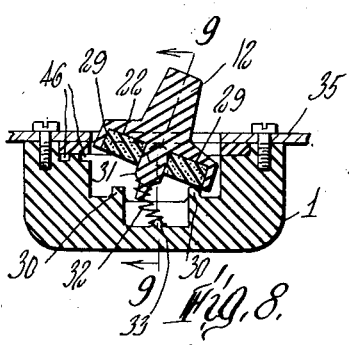
Figure 8 is a detail sectional view on line 8—8 of Figure 5.
Figure 9:
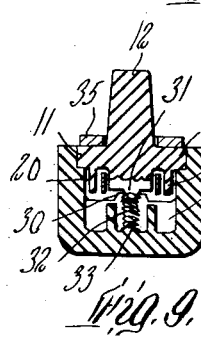
Figure 9 is a detail sectional view on line 9—9 of Figure 8.

The under side of the lever 12 is provided with spaced sockets 22, as shown in Figure 8, within which are positioned soft rubber bumpers 29 which engage one or the other of a pair of abutments 30 integral with the box 1 and cushion the motion of the lever and cause its motion to be substantially noiseless. Centrally between the recesses 22 the lever 12 is provided with a projection 31 over which one end of a coil spring 32 is positioned, the other end of which engages a projection 33 from the base of the box, this spring 32 tending to retain the lever 12 in either of its rocked positions with one of the other of its cushions 29 engaging the corresponding abutment 30. The projection 33 is so enclosed by wall portions 34 and 42 of the box that when the spring 32 is dropped into position thereover, the upper end of this spring may be easily engaged by the lever projection 31. The wall portions 34 are partitions arranged in parallel relation between the sides 3 and are of less height than these sides.

The lever is held in position with its trunnions 11 in the sockets 9 by the metal face plate 35 which covers the top of the box and is secured to the box at the end walls 2 as by suitable screws 36. The top plate 35 is provided with ears 37 at its ends having slots 38 therethrough by which the box may be secured in position in the wall in a manner well known in the art. The width of the plate 35 forms a convenient gage for indicating the length of the wire end which should be stripped of insulation in assembling the switch, and a hole 35a through the plate 35 may be used to receive the end of such stripped portion, while the remainder may be bent over to form a loop for engagement beneath the binding screw of a terminal plate. Beneath the plate 35 the box is closed off partly by the H-shaped insulating plates 40, one of which is shown in Figure 3.

Figure 10:
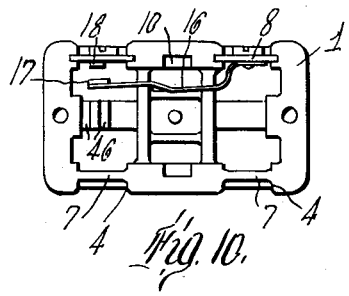
Figure 10 is a top plan view of a switch box with cover removed arranged for a single pole switch, showing the contact spring in open position and omitting the switch actuating lever.
Figure 11:
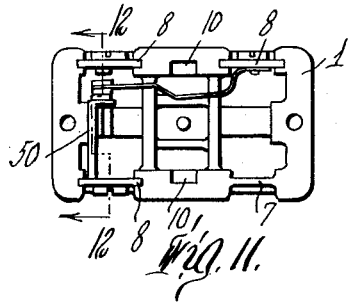
Figure 11 is a view similar to Figure 10, but showing the box arranged for a three-way switch.
Figure 12:
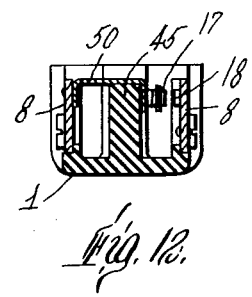
Figure 12 is a detail sectional view on line 12—12 of Figure 11.

The abutments 30, to which reference has already been made, are positioned at the junctures of a pair of cross partitions 42 of less height than the sides and ends of the box and a longitudinal central wall 45 of less height than the end walls and which, adjacent to one of the end walls, is provided on its upper face with a pair of lateral channels 46. These lateral channels are used when the switch boxes are employed in three- or four-way switches, one being employed in the case of a three-way, and both being employed in the case of a four-way switch as will later appear. The partition 45 divides the interior of the box into a pair of laterally spaced portions within one of which a spring arm 16 is placed when a single or three-way switch is desired and as shown in Figures 10 and 11, respectively, the other channel being free from such spring arms in these instances. In the case of two-way and four-way switches two of these spring arms 16 are employed, one arm on each side of the central partition 45.

In the case of the single pole switch, one only of the cam elements 20 of the actuating lever is employed, the other being idle. As may be seen by an inspection of Figure 10, the switch is provided with a single arm 16 having a contact member 17 normally in contact with its terminal plate 8, but which may be sprung away therefrom by rocking the actuating lever 12 in the proper direction.

In the case of the three-way switch shown in Figure 11, when the contact element 17 is moved away from engagement with its terminal plate 8, it is moved into contact with a conductor 50 which extends across the central partition 45 through one of the grooves 46 and is secured to the terminal plate 8 in the opposite side of the box from the plate 8 with which the contact element 17 normally engages. In the three-way switch it is therefore seen that three terminal plates 8 are employed.

Figure 13:
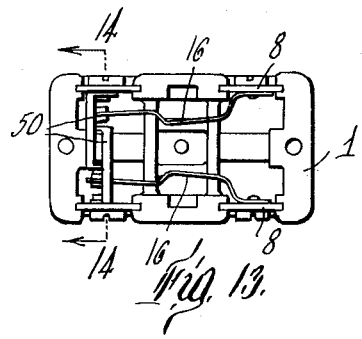
Figure 13 is a view similar to Figure 10, but showing a four-way switch.
Figure 14:
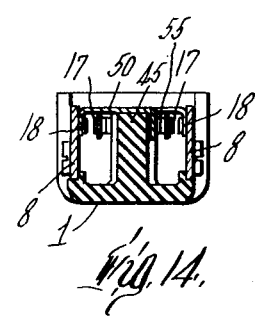
Figure 14 is a detail sectional view on line 14—14 of Figure 13.
Figure 15:
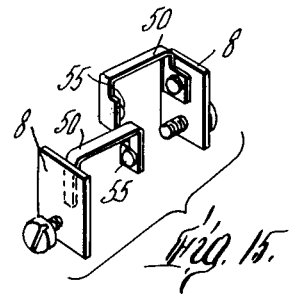
Figure 15 is a perspective view showing two of the terminal contacts for the four-way switch.

When either two or four-way switches are desired, four terminal plates are employed, as shown in Figures 5 and 7 for two-way switches and in Figures 13 and 14 for the four-way switches. In the case of the four-way switches, a pair of conductors such as 50 are employed, one of these occupying each of the channels 46 in the central longitudinal partition 45 and each extending from one of the terminal plates 8 at the corresponding end of the box across the central partition 45 and having a down turned end portion provided with a contact element 55 which is engaged by the adjacent contact elements 17 when this element is moved out of contact with its adjacent terminal button 18 when the actuating lever is swung in one direction.

It will thus be seen that employing the same box the switch may be made up as single pole, double pole, three-way or four-way, with the exception that for single and three-way it is preferable to close off the proper recesses 4 by integral insulating portions 7, although if desired and where boxes so specially molded are not available, these could be supplied by flat insulating inserts in place of the terminal plates 8. In any event, however, the molding operation is considerably facilitated since the dies may be substantially the same for each box.

Figure 16:
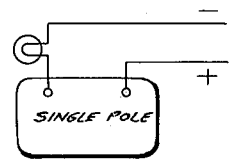
Figure 17:
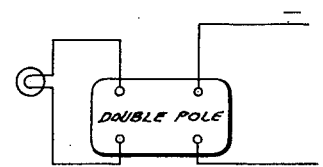
Figure 18:
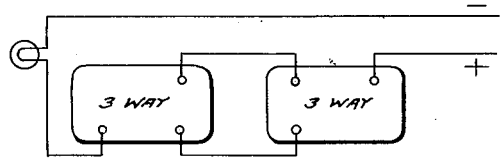
Figure 19:
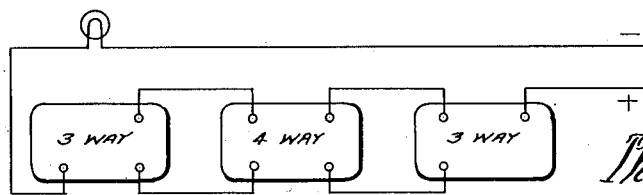

In Figures 13 to 19 the wiring for each of these types of boxes is shown, Figure 16 illustrating the single pole switch where the make and break is in one side only, and Figure 17 illustrating the make and break in both sides of the circuit. Figure 18 shows the use of two three-way switches by which the circuit may be closed or opened by either switch, while Figure 19 shows the use of a pair of three-way switches arranged at the end of a series of switches with intermediate four-way switches, by reason of which the circuit may be made or broken at any of the switches, regardless of the setting of any of the others. While these arrangements are well known in the art, they are shown herein for the sake of illustrating the desirability of providing for switches of each type with minimum changes in assembly from one to another.

From the foregoing description of embodiments of this invention, it should be evident to those skilled in the art that various changes and modifications may be made therein without departing from the spirit or scope of this invention.

I claim:

1. A switch box of insulating material having a base, ends and sides upstanding from said base, said sides being recessed adjacent to said ends, a partition from said ends disposed centrally between said sides and of less height than said sides and ends, said partition having spaced channels extending across its upper face parallel to said ends, and said base having an upward projection on which a coil spring may be centered.

2. In combination with a switch box of insulating material having a base, ends and sides upstanding from said base, said sides being recessed adjacent to said ends, a pair of partitions arranged in parallel relation between said sides inwardly of said recesses and of less height than said ends and sides, a partition from said ends disposed centrally between said sides and of less height than said sides and ends, said last mentioned partition having spaced channels extending across its upper face parallel to said ends, and said base having an upward projection between said partitions on which a coil spring may be centered.

3. A switch box of insulating material having a base, ends and sides upstanding from said base, said sides being recessed adjacent to said ends, a partition from said ends disposed centrally between said sides and of less height than said sides and ends, said partition having spaced channels extending across its upper face parallel to said ends, said base having an upward projection on which a coil spring may be centered, the recesses in at least one of said sides being occupied by flat terminal plates to said sides, a spring conductor arm secured at one end to one of said terminal plates and having a contact member at its opposite end normally engaging another of said plates, and means actuable to spring said contact member out of engagement with said other terminal plate.

4. A switch box of insulating material having a base, ends and sides upstanding from said base, said sides being recessed adjacent to said ends, a partition from said ends disposed centrally between said sides and of less height than said sides and ends, said partition having spaced channels extending across its upper face parallel to said ends, said base having an upward projection on which a coil spring may be entered, the recesses in at least one of said sides being occupied by flat terminal plates parallel to said sides, a spring conductor arm secured at one end to one of said terminal plates and movable laterally of said box and having a contact member at its opposite end normally engaging another of said plates, a lever pivotally mounted in said sides and having a prong extending toward said base, and a coil spring engaging at its ends over said prong and said projection and tending to hold said lever in selected of two angular positions, said lever having a cam element engageable with said arm in one of said positions and holding said contact member out of engagement with said other plate.

5. A switch box of insulating material having a base, ends and sides upstanding from said base, said sides being recessed adjacent to said ends, a partition from said ends disposed centrally between said sides and of less height than said sides and ends, said partition having spaced channels extending across its upper face parallel to said ends, said base having an upward projection on which a coil spring may be entered, the recesses in at least one of said sides being occupied by flat terminal plates parallel to said sides, a spring conductor arm secured at one end to one of said terminal plates and movable laterally of said box and having a contact member at its opposite end normally engaging another of said plates, a lever pivotally mounted in said sides and having a prong extending toward said base, and a coil spring engaging at its ends over said prong and said projection and tending to hold said lever in selected of two angular positions, said lever having a cam element engageable with said arm in one of said positions and holding said contact member out of engagement with said other plate, said lever having a pair of spaced recesses on its under side, and soft rubber inserts in said recesses engageable against one or the other of said partitions when said lever is in either of its angular positions.

6. A switch box of insulating material having a base, ends and sides upstanding from said base, said sides being recessed adjacent to said ends, a partition from said ends disposed centrally between said sides and of less height than said sides and ends, said recesses being occupied by flat terminal plates, a spring conductor arm swingable laterally of said box and having one end secured to each plate adjacent to one of said ends and having a contact at its opposite end normally in engagement with the other terminal plate on the same side of said box, and means actuable to separate said contacts from engagement with said terminal plates.

7. A switch box of insulating material having a base, ends and sides upstanding from said base, said sides being recessed adjacent to said ends, a partition from said ends disposed centrally between said sides and of less height than said sides and ends, said recesses being occupied by flat terminal plates, a spring conductor arm swingable laterally of said box and having one end secured to each plate adjacent to one of said ends and having a contact at its opposite end normally in engagement with the other terminal plate on the same side of said box, and an actuating lever pivoted in said sides and having a prong extending toward said base, a coil spring engaging at its ends over said prong and projections and tending to hold said lever in either of two angular positions, said lever having cam elements positioned to engage said arms and retain said contacts out of engagement with their mating terminal plates when said lever is in one of said angular positions.

8. A switch box of insulating material having a base, ends and sides upstanding from said base, said sides being recessed adjacent to said ends, a partition from said ends disposed centrally between said sides and of less height than said sides and ends, the recesses in at least one of said sides being occupied by terminal plates, a spring conductor arm secured at one end to one of said terminal plates and having a contact member at its opposite end normally engaging another of said plates, the third recess opposite to said other terminal plate having a terminal plate therein, a conductor extending from said last mentioned terminal plate toward the opposite side of said box and having a terminal member positioned to be contacted by said contact member when said contact member is out of engagement with the other of said plates, and means actuable to spring said contact member out of engagement with said other terminal plate.

9. A switch box of insulating material having a base, ends and sides upstanding from said base, said sides being recessed adjacent to said ends, a partition from said ends disposed centrally between said sides and of less height than said sides and ends, said partition having a channel extending across its upper face parallel to said ends, the recesses in at least one of said sides being occupied by terminal plates, a spring conductor arm secured at one end to one of said terminal plates and having a contact member at its opposite end normally engaging another of said plates, the third recess opposite to said other terminal plate having a terminal plate therein, a conductor extending from said last mentioned terminal plate toward the opposite side of said box and having a terminal member positioned to be contacted by said contact member when said contact member is out of engagement with the other of said plates, and means actuable to spring said contact member out of engagement with said other terminal plate, said conductor lying in said channel.

10. In combination with a switch box of insulating material having a base and ends and sides upstanding from said base, said sides being recessed adjacent to said ends, a pair of partitions arranged in parallel relation between said sides inwardly of said recesses and of less height than of said ends and sides, a partition from said ends disposed centrally between said sides, said last mentioned partition having spaced channels extending across its upper face parallel to said ends, a terminal plate in each of said recesses, a conductor arm fixed to one of each of said terminal plates at one end and having a contact member normally engaging the other terminal plate on the same side of said box, a conductor extending from each of said other terminal plates through one of said channels toward the opposite terminal plate in position to be contacted by the adjacent contact member when said contact member is sprung away from its normally contacted plate, and means actuable to spring said arms away from their terminal plates and into engagement with said conductors.

11. In combination with a switch box of insulating material having a base and ends and sides upstanding from said base, said sides being recessed adjacent to said ends, a pair of partitions arranged in parallel relation between said sides inwardly of said recesses and of less height than of said ends and sides, a partition from said ends disposed centrally between said sides, said last mentioned partition having spaced channels extending across its upper face parallel to said ends, a terminal plate in each of said recesses, a conductor arm fixed to one of each of said terminal plates at one end and having a contact member normally engaging the other terminal plate on the same side of said box, a conductor extending from each of said other terminal plates through one of said channels toward the opposite terminal plate in position to be contacted by the adjacent contact member when said contact member is sprung away from its normally contacted plate, said box having a projection from its base, a lever fulcrumed in said sides and having a prong extending toward said base, a coil spring having its ends engaging said prong and projection, said box having a pair of abutments spaced lengthwise, said lever having cushion elements positioned to contact one or the other of said abutments when said lever is in a corresponding angular position, and said lever having elements adapted to engage and press said arms with their contact members in engagement with said conductors when said lever is in one of said angular positions and permitting said contact members to engage said terminal plates when said lever is in the other angular position.

References Cited in the file of this patent

UNITED STATES PATENTS

| 1,641,264 | Gaynor et al. | Sept. 6, 1927 |
| 1,850,785 | Bentley | Mar. 22, 1932 |
| 1,852,899 | Ramsay | Apr. 5, 1932 |
| 1,874,025 | Clapp | Aug. 30, 1932 |
| 2,011,293 | Krieger | Aug. 13, 1935 |
| 2,059,926 | Barnitz | Nov. 3, 1936 |
| 2,215,311 | Adams | Sept. 17, 1940 |
| 2,215,319 | Brown | Sept. 17, 1940 |

(Other references on following page)

UNITED STATES PATENTS

| | | |
|---|---|---|
| 2,447,871 | Riche | Aug. 24, 1948 |
| 2,486,365 | Youhouse | Oct. 25, 1949 |
| 2,506,212 | Grohsgal | May 2, 1950 |
| 2,570,281 | Russell et al. | Oct. 9, 1951 |
| 2,626,334 | Koenig | Jan. 20, 1953 |
| 2,626,335 | Landin | Jan. 20, 1953 |
| 2,647,962 | Batcheller | Aug. 4, 1953 |
| 2,659,792 | Boardman | Nov. 17, 1953 |
| 2,669,613 | Despard | Feb. 16, 1954 |
| 2,713,082 | Hubbell | July 12, 1955 |
| 2,734,115 | Dupre | Feb. 7, 1956 |
| 2,738,389 | Johnson | Mar. 13, 1956 |

FOREIGN PATENTS

| | | |
|---|---|---|
| 641,296 | Great Britain | Aug. 8, 1950 |